United States Patent
Hollenbach

(10) Patent No.: US 12,163,605 B2
(45) Date of Patent: Dec. 10, 2024

(54) CONNECTION SYSTEM FOR A CRYOGENIC TANK

(71) Applicant: ArianeGroup GmbH, Taufkirchen (DE)

(72) Inventor: Bert Hollenbach, Bremen (DE)

(73) Assignee: Arianegroup GmbH, Taufkichen (DE)

( * ) Notice: Subject to any disclaimer, the term of this patent is extended or adjusted under 35 U.S.C. 154(b) by 59 days.

(21) Appl. No.: 18/072,095

(22) Filed: Nov. 30, 2022

(65) Prior Publication Data

US 2023/0175619 A1 Jun. 8, 2023

(30) Foreign Application Priority Data

Dec. 3, 2021 (DE) .......................... 102021131892.0

(51) Int. Cl.
*F16L 23/24* (2006.01)
*F16L 23/032* (2006.01)
*F16L 51/00* (2006.01)

(52) U.S. Cl.
CPC .............. *F16L 23/24* (2013.01); *F16L 23/032* (2013.01); *F16L 51/00* (2013.01)

(58) Field of Classification Search
CPC ....... F16L 19/025; F16L 23/02; F16L 23/032; F16L 23/24; F16L 23/16; F16L 23/18; F16L 23/20; F16L 23/22; F16L 41/00; F16L 41/001; F16L 51/00
USPC ................................ 285/187, 205, 208, 206
See application file for complete search history.

(56) References Cited

U.S. PATENT DOCUMENTS

| 10,179,304 | B2 | 1/2019 | Winborn |
| 2014/0339177 | A1 | 11/2014 | Lane |
| 2015/0267864 | A1 | 9/2015 | Patterson et al. |
| 2018/0038547 | A1 | 2/2018 | Hand |

(Continued)

FOREIGN PATENT DOCUMENTS

| JP | S5493818 U | 7/1979 |
| JP | H09208929 A | 8/1997 |
| JP | 2015006658 A | 1/2015 |

(Continued)

OTHER PUBLICATIONS

European Search Report for corresponding European Patent Application No. 22208273 dated Apr. 18, 2023.

*Primary Examiner* — Aaron M Dunwoody
(74) *Attorney, Agent, or Firm* — Greer, Burns & Crain, Ltd.

(57) ABSTRACT

A connection system for a cryogenic tank with a tank wall formed with a first material. A connector is provided for a component to be connected to the tank. The connector is formed with a second material, and the connector is positioned on an exterior side of the tank and essentially congruent with a passage opening of the tank wall. At least one sealing element is provided, and the first and the second material have different thermal expansion coefficients. A counterpart formed with the second material is positioned on an interior side of the tank, and is connected with the connector via at least two fastening elements, such that the tank wall is clamped between the counterpart, the connector and the at least one sealing element, and a slight displaceability of the connector and the counterpart parallel to the tank wall remains to compensate for thermally induced mechanical stresses.

15 Claims, 2 Drawing Sheets

(56) References Cited

U.S. PATENT DOCUMENTS

2018/0339249 A1* 11/2018 Winborn ............ B29C 66/8167

FOREIGN PATENT DOCUMENTS

| JP | 2016070455 A | 5/2016 |
|----|--------------|--------|
| WO | 2018019651 A1 | 2/2018 |

* cited by examiner

CONNECTION SYSTEM FOR A CRYOGENIC TANK

CROSS-REFERENCES TO RELATED APPLICATIONS

This application claims the benefit of the German patent application No. 102021131892.0 filed on Dec. 3, 2021, the entire disclosures of which are incorporated herein by way of reference.

FIELD OF THE INVENTION

The invention relates to a connection system for a cryogenic tank, the tank wall of which is formed with a first material, wherein the connection system has a connector for a component to be connected to the tank, and wherein the connector is formed with a second material, and the connector is positioned on an exterior side of the tank and essentially congruent with a passage opening of the tank wall, and wherein at least one sealing element is provided, and the first and the second material have different thermal expansion coefficients.

BACKGROUND OF THE INVENTION

Liquid, meaning extremely cold (cryogenic) hydrogen ($LH_2$ at 20 K—253.15° C.) and oxygen (LOX at 90 K or −183.15° C.), is used as the propellant in launch vehicles due to the high energy density. As a rule, the tanks of launch vehicles are made out of aluminum, and connecting parts like lines, sensors or the like, can be directly connected with threaded receptacles in the tank wall. Metallic seals are usually used for sealing screwed connections.

Load-optimized design makes it possible to achieve significant weight advantages in relation to the metal design by using carbon fiber reinforced plastics (CFK or, in English, CFRP) for manufacturing fuel tanks. The unequal thermal expansion coefficients of the different materials can here lead to thermally induced mechanical stresses and deformations. Among other things, the disadvantage to CFK components is that threaded receptacles can only be realized with great effort. In addition, the metallic profile seals used so far in cryogenic metallic containers can damage the matrix and reinforcing fibers of the composite material owing to their thin contact line and possibly hard sealing edge, and thereby cause leakage and strength losses.

The unequal thermal expansion coefficients pose yet another challenge to combining CFK components with metal components. CFK has a thermal expansion coefficient $\alpha 1$ of about $0.2 \times 10-6$ K−1 in the fiber direction and at a level of $30 \times 10-6$ K−1 perpendicular to the fiber direction, while the thermal expansion coefficient $\alpha 2$ comes to about $12 \times 10-6$ K−1 to $15 \times 10-6$ K−1 for steel in all directions, and about $23 \times 10-6$ K−1 for aluminum. Therefore, cooling by roughly 200° C. leads to a strong shrinkage of a metallic component, while a CFK component remains approximately unchanged in the fiber direction. A CFK component shrinks significantly more perpendicular to the fiber direction in comparison to a metal component.

The effects mentioned above can lead to a varying shrinkage rate of a metal component and a CFK component in a radial direction. For example, if a metal component is tightly screwed to a CFK component, a connecting element can be undesirably exposed to bending stresses. Metallic inserts integrated directly into a CFK component are likewise subjected to mechanical stresses, which are caused by the varying thermal expansion rates. There here exists the danger of a delamination of the insert and matrix, and an accompanying leakage.

SUMMARY OF THE INVENTION

An object of the invention is to provide a connection system for a cryogenic tank, in which mechanical stresses thermally induced by the unequal thermal expansion coefficients of the combined materials do not lead to a radial load on connecting elements.

This object is achieved by virtue of the fact that a counterpart formed with the second material is positioned on an interior side of the tank, and can be connected with the connector with the help of at least two fastening elements, such that the tank wall is clamped between the counterpart, the connector and the at least one sealing element, and a slight displaceability of the connector and the counterpart parallel to the tank wall remains, in order to compensate for thermally induced mechanical stresses.

Because the connector and counterpart are materially uniform, thermally induced mechanical stresses inside of the connection system are reduced at deep cold (cryogenic) temperatures of equal to or less than about −183° C. in the tank and comparatively high outside temperatures of roughly 20° C., since the cold-induced radial shrinkage of the connector and the counterpart is about the same. Furthermore, the counterpart which abuts against the side of the tank causes any forces introduced from the connector into the tank wall to be applied over a larger area.

The connector preferably has essentially a sleeve-like design, and has a continuous fastening flange on a first end that faces the exterior side of the tank, and a connecting flange for the component on a second end that points away from the latter. As a result, a standard component can be used as the connector.

In a technically advantageous embodiment, the at least two fastening elements are designed as threaded bolts. This makes it possible to adjust the level of axial tensioning for the connector and counterpart, and hence a resultant clamping force on the tank wall, thereby allowing for at least a slight radial displaceability of the mentioned components, or a "floating bearing" in relation to the tank wall, without impairing the sealing effect.

It is preferred that the counterpart have essentially a circular design. This ensures a peripherally uniform force application.

In a further development, the connector, the counterpart and the at least one sealing element are essentially designed rotationally symmetrical to a longitudinal center line. This provides for a cost-effective manufacturability. The connector, the counterpart and the sealing element each have a preferably circular opening, which in the assembled state of the connection system at a room temperature of about 20° C., are preferably each positioned congruently with each other and congruently with the passage opening in the tank wall.

The fastening flange preferably has a number of preferably non-continuous threaded holes corresponding to the number of threaded bolts, and the counterpart has a corresponding number of threadless through holes for the threaded bolts or vice versa. In principle, providing the non-continuous threaded holes or the blind holes with a thread makes a sealing element sufficient. The component provided with the non-continuous threaded holes has respective threadless through holes designed congruently with the latter.

A favorable further development provides that, depending on whether the fastening flange of the connector or the counterpart is provided with the non-continuous threaded holes, the at least one sealing element is positioned between the exterior side of the tank and the fastening flange and/or between the counterpart and the interior side of the tank. This provides for a higher flexibility during assembly. Depending on whether the counterpart or the connector is provided with the non-continuous threaded holes, the threaded bolts are screwed in from an interior of the tank or proceeding from the outside environment of the tank. A precondition here is that the tank interior be correspondingly accessible.

The first material is preferably a fiber composite plastic, such as a glass fiber reinforced or a carbon fiber reinforced plastic. This makes it possible to realize a lighter tank in comparison to an aluminum tank.

The second material is preferably formed with a metal, such as aluminum, titanium, stainless steel or with a metal alloy. This enables a mechanically robust connection of components to the tank, for example to lines, pipes, sensors or the like.

In the case of a favorable further development, the at least one sealing element is formed with a plastic, such as polytetrafluoroethylene (PTFE). The soft plastic prevents the tank wall from becoming damaged by the metal parts braced therewith, and simultaneously produces a reliable sealing effect.

In an advantageous further development, the at least one sealing element is preferably designed as an essentially circular flat seal or as a spring-loaded seal. This provides a reliable sealing effect while not affecting the displaceability and given just one sealing element.

BRIEF DESCRIPTION OF THE DRAWINGS

A preferred exemplary embodiment of the invention will be explained in more detail below based upon schematic figures. Shown on.

DETAILED DESCRIPTION OF THE PREFERRED EMBODIMENTS

Figure 1:
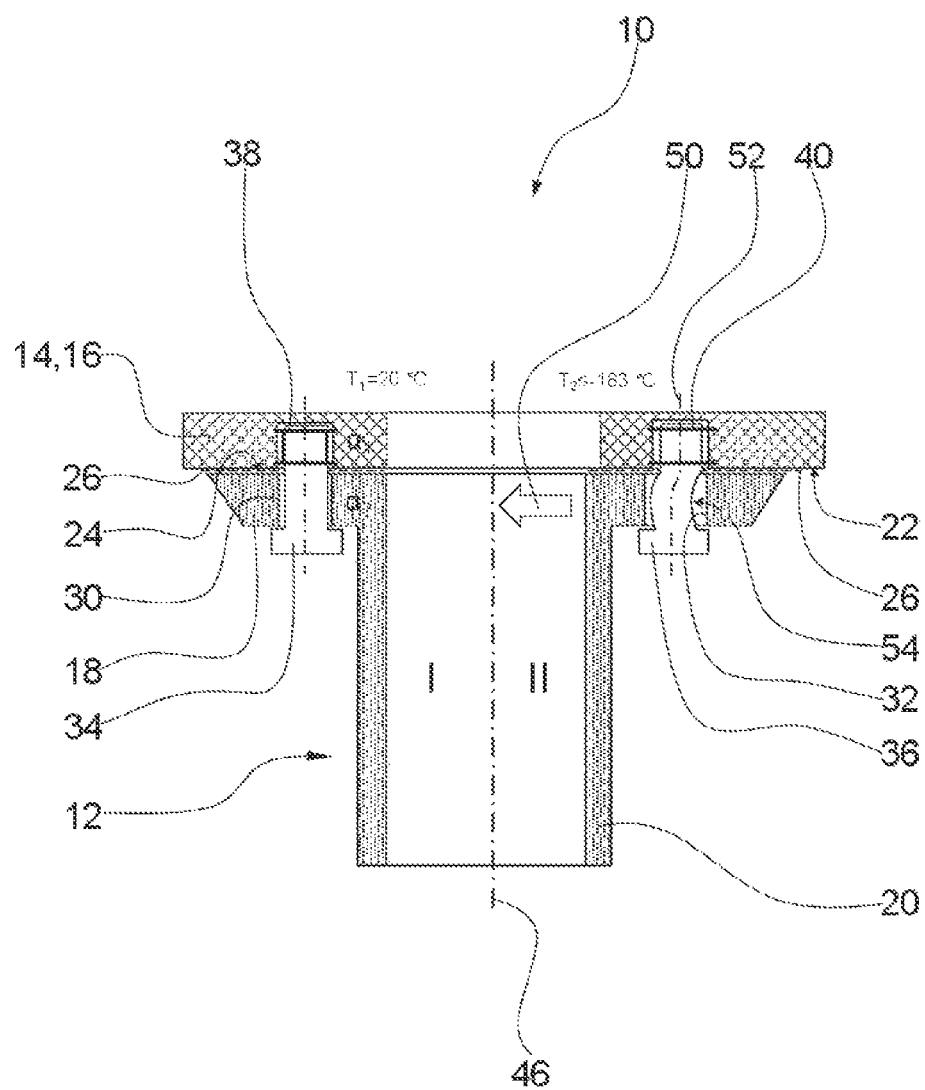
FIG. 1 is a schematic longitudinal section through a connection system according to prior art, and on FIG. 2 is a schematic longitudinal section through a connection system according to the invention.

FIG. 1 shows a schematic longitudinal section through a connection system according to prior art, wherein the connection system in the left half of the drawing I is at a temperature T1 of about 20° (room temperature), whereas the connection system in the right half of the drawing II is at a cryogenic temperature of less than or equal to −183.15° C. (boiling point of oxygen).

Among other things, a connection system 10 comprises a connection spigot 12 for a component (not depicted here) to be connected to a tank wall 14 of a tank 16 not shown in any greater detail. The connection spigot 12 has a circular flange 18 that serves to abut against the tank wall 14, and continues from a tubular connection section 20 that points away from the tank wall 14. A sealing element 26 is preferably provided between an exterior side 22 of the tank wall 14 and a sealing surface 24 of the flange 18. The tank wall 14 is fabricated with a fiber composite plastic, such as a carbon fiber-reinforced plastic, while the connection spigot 12 is formed with a metallic material, such as steel, titanium, or aluminum.

The flange 18 has a plurality of through holes that are peripherally spaced uniformly apart from each other, of which only two through holes 30, 32 are shown here as representative for all additional ones. The flange 18 is fastened to the tank wall 14 with the help of a number of threaded bolts that correspond to the number of through holes, and that are each screwed into an allocated threaded insert on the tank wall side, wherein threaded inserts introduced proceeding from the exterior side 22 of the tank 16 do not penetrate through the tank wall 14. Of the threaded bolts and threaded inserts, only a respective two threaded bolts 34, 36 as well as two threaded inserts 38, 40 (so-called "inserts") are graphically depicted as representative for all additional ones.

Apart from temperature-related expansion and shrinkage effects, the connection system 10 has a structure that is rotationally symmetrical to a longitudinal center line 46. The connection system 10 is at room temperature or a temperature T1 of about 20° C. in a left half of the drawing I, whereas the connection system 10 is at a cryogenic temperature of equal to or less than −183.15° C. in a second half of the drawing II.

A material or raw material formed with a carbon-reinforced plastic has a thermal expansion coefficient α1 of about 0.2×10−6 K−1 in the fiber direction and at a level of 30×10−6 K−1 perpendicular to the fiber direction, while the thermal expansion coefficient α2 comes to about 12×10−6 K−1 to 15×10−6 K−1 for a material like steel in all spatial directions, and about 23×10−6 K−1 for aluminum. Because these thermal expansion coefficients α1, 2 for the used materials deviate significantly from each other, when the tank 16 cools by about 200° C., as occurs when it is filled with a cryogenic oxygen proceeding from room temperature, significant shrinkage effects arise for the connection spigot 12 in relation to the only minimally contracting tank wall 14 of the tank 16, as denoted with the white arrow 50. For example, this results in a considerable mechanical radial load on the threaded bolt 36 transverse to its longitudinal center line 52. The thermally induced mechanical load on the threaded bolt 36 can become so high that the latter undergoes plastic deformation, as symbolically denoted by its sectionally strongly curved outer contour 54.

Figure 2:
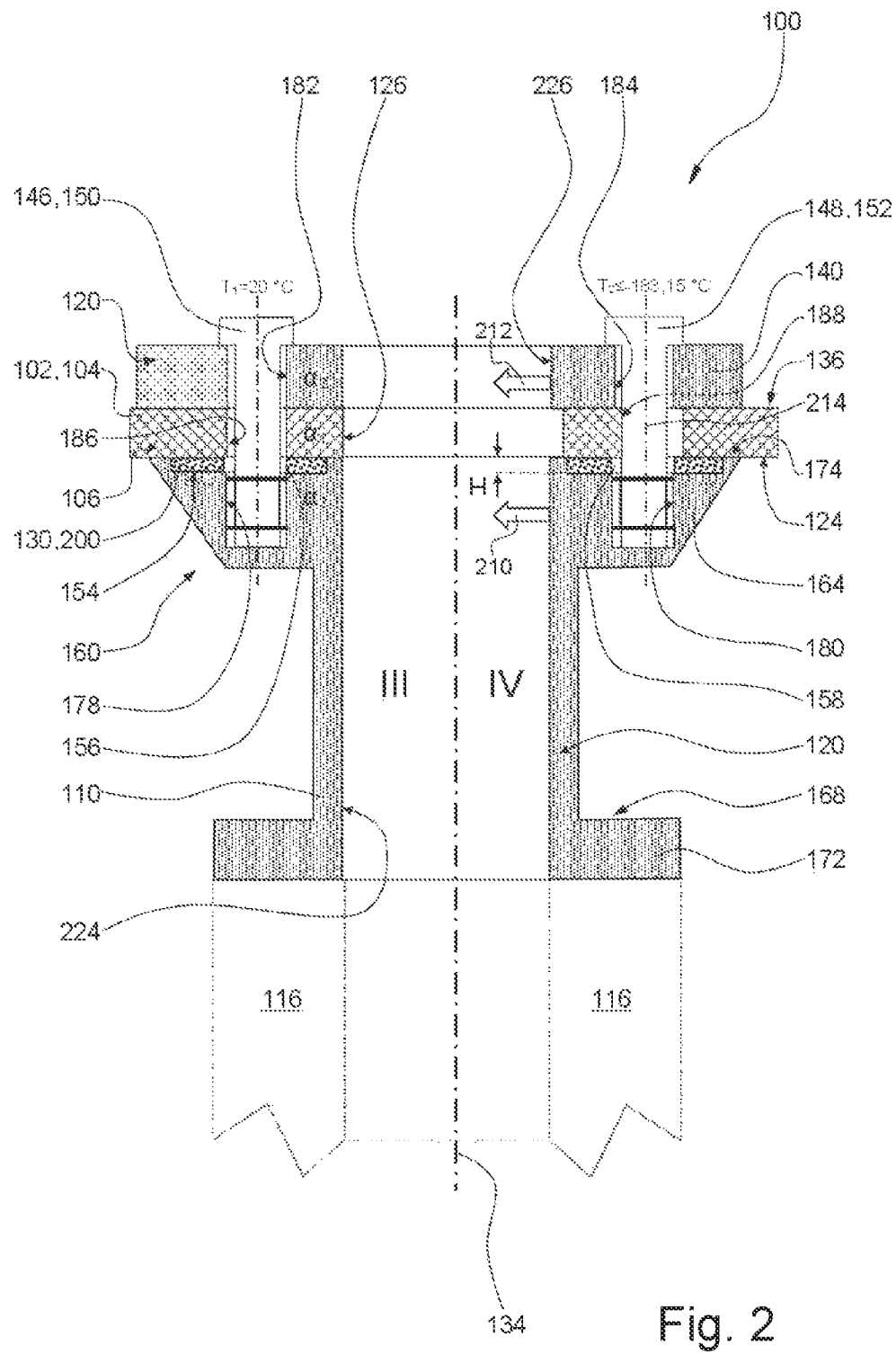

These temperature-induced shrinkage effects of the connection system 10 sketched above lead to undesired mechanical stresses between the tank wall 14 and the connection spigot 12 of the connection system 10, which are largely avoided in the connection system according to the invention (see FIG. 2).

FIG. 2 illustrates a schematic longitudinal section of a connection system according to the invention, wherein the connection system is at a temperature T1 of about 20° (room temperature) in the left half of the drawing III, whereas the connection system is at a cryogenic temperature of less than or equal to −183.15° C. (boiling point of oxygen) in the right half of the drawing IV.

Among other things, a connection system 100 for a cryogenic tank 102 whose tank wall 104 is formed with a first material 106 comprises a connector 110 for a component 116 to be connected thereto. The connector 110 is formed with a second material 120. The connector 110 is arranged on an exterior side of the tank 124 essentially congruently with a passage opening 126 in the tank wall 104. Strictly by way of example, a sealing element 130 is here provided for sealing purposes. Apart from thermally induced shrinkage or expansion effects, the connection system 100 has a structure that is essentially rotationally symmetrical to a longitudinal center line 134.

The first material 106 of the tank wall 104 involves a fiber composite plastic, such as a carbon fiber-reinforced plastic (CFK). Alternatively, the tank wall 104 can also be formed with a glass fiber-reinforced plastic (GFK) or with a plastic reinforced with Aramid® fibers. The first material 106 has a thermal expansion coefficient α1 that comes to about 0.2×10−6 K−1 in the fiber direction and to about 30×10−6 K−1 perpendicular thereto. The second material 120 of the connector 110 is a homogeneous metallic material, such as aluminum, steel, or titanium. If the second material 120 is steel or aluminum, a directionally independent thermal expansion coefficient α2 lies within a range of 12×10−6 K−1 to 15×10−6 K−1 in the case of steel, and comes to about 23×10−6 K−1 in the case of aluminum. An approximately circular counterpart 140 likewise formed with the second material 120 is positioned on an interior side of the tank 136, and can be connected with the connector 110 with the help of at least two fastening elements, such that the tank wall 104 is reliably clamped or braced between the counterpart 140, the connector 110 as well as the sealing element 130. At least a slight displaceability of the connector 110 and the counterpart 140 parallel to the tank wall 104 remains in order to compensate for thermally induced mechanical stresses owing to the varying thermal expansion coefficients. A material thickness of the counterpart 140 corresponds roughly to a material thickness of the tank wall 104.

Of the fastening elements preferably arranged peripherally uniformly to each other, only two fastening elements 146, 148 are shown and labeled here as representative for all remaining ones. The fastening elements 146, 148 are here designed as threaded bolts 150, 152 only by example. The sealing element 130 is received in a continuous groove 154 (ring groove) with an essentially U-shaped cross sectional geometry, and has passage openings 156, 158 for a respective one of the fastening elements 146, 148 as well as passage openings for the fastening elements that cannot be shown on FIG. 2. The continuous groove 154 in the fastening flange 164 here extends in a radial direction (radially inward and outward) on either side of the fastening elements 146, 148 as well as the nonvisible fastening elements, but does not take up the entire radial width of a contact surface 174 of the fastening flange 164.

The connector 110 essentially has a sleeve-like design, and has a continuous fastening flange 164 on a first end 160 that faces the exterior side of the tank 124 and a connecting flange 172 for the component 116 to be connected on a second end 168 pointing axially away therefrom. The U-shaped groove 154 in the fastening flange 164 is designed in such a way that the sealing element 130 in the braced state is compressed essentially in the axial direction by the counterpart 140, tank wall 104 and connector 110 to such an extent as to be flush with the contact surface 174 of the fastening flange 164.

Instead of the sealing element 130 and U-shaped groove 154, it is possible to provide a sealing element (not labeled for the sake of a better graphic overview) in a continuous and U-shaped groove extending only radially outward relative to the fastening elements 146, 148 in the fastening flange 164, as graphically denoted on FIG. 2 only with a dashed outline view. In such a constellation, the sealing element can also be designed as a profile seal or the like.

The fastening flange 164 has a number of preferably non-continuous threaded holes 178, 180 that correspond to the number of threaded bolts 150, 152, whereas a corresponding number of threadless through holes 182, 184 for passing through the threaded bolts 150, 152 is introduced into the counterpart 140. In order to be able to pass the threaded bolts 150, 152 through the tank wall 104, the latter likewise has a number of threadless through holes 186, 188 preferably peripherally spaced uniformly apart from each other that correspond to the number of threaded bolts 150, 152. The threaded holes 178, 180 in the connector 110, the through holes 182, 184 in the counterpart 140, as well as the through holes 186, 188 in the tank wall 104 are each essentially congruent with each other in design. As opposed to the illustration on FIG. 2, the non-continuous threaded holes 178, 180 can also be introduced into the counterpart 140, while a corresponding number of threadless through holes is then provided inside of the fastening flange 164 of the connector 110 (not shown). In such a case, the fastening elements 146, 148 are twisted by 180° in relation to the illustration on FIG. 2, i.e., inserted proceeding from the exterior side of the tank 124. This can be advantageous given a more difficult access to the tank interior.

The axially non-continuous threaded holes 178, 180 in the counterpart 140 reduce the technical effort required to seal the connection system 100. Depending on whether the fastening flange 164 of the connector 110 or the counterpart 140 is equipped with the non-continuous threaded holes 178, 180, the sealing element 130 is positioned between the tank wall 104 and the fastening flange 164 of the connector 110 and/or between the counterpart 140 and the interior side of the tank 136. Additional sealing elements might possibly have to be provided to completely seal the leakage paths of the connection system 100.

The sealing element 130 is here designed as a circular flat seal 200 with a small axial height H strictly by way of example, but can alternatively also be realized with O-rings or with spring-loaded seals. The sealing element 130 is preferably realized with polytetrafluoroethylene (PTFE or Teflon®).

The connection system 100 in the first, left half of the drawing III is at room temperature, meaning at a temperature T1 of about 20° C. Filling the tank 102 with a cryogenic or deep cold fuel such as liquid oxygen at a temperature of equal to or less than −183.15° C. causes the connection system 100 to intensively cool by on the order of 200° C. or more, accompanied by significant mechanical shrinkage effects of the connector 110 formed with the second, metallic material 120 and of the counterpart 140. However, given the material uniformity of the connector 110 and counterpart 140, the cooling-induced shrinkage rates—as denoted with the two arrows 210, 212—are essentially the same, so that, as opposed to previously known connection systems, there can be no plastic deformation of the fastening element 148 transverse to its allocated longitudinal center line 214, as long as the fastening element 148 is not made to abut against the through hole 188 inside of the tank wall 104 with too high of a radial force. The same holds true for the through hole 186 in the tank wall 104 with regard to the fastening element 146 located therein. Against this backdrop, it is advantageous for the cross section of the through holes 186, 188 in the tank wall 102 to have larger dimensions than the cross sections of the through holes 182, 184 in the counterpart 140, so as to have enough radial clearance available to compensate for the thermally induced shrinkage and expansion rates of the connector 110 and the counterpart 140. The sealing element 130 is used, on the one hand, to establish the fluidic seal, and, on the other hand, to reduce the danger of mechanical damage to the tank wall 104 formed with a fiber composite plastic as the result of being mechanically clamped on either side between the connector 110 formed with a metallic material and the counterpart 140 likewise formed with the metallic material.

Finally, in the mounted state on FIG. 2, the passage openings 126 in the tank wall 104 as well as essentially cylindrical passage openings 224, 226 are positioned approximately congruently with each other, so as to achieve the lowest possible flow resistance for a fluid passing through.

The invention relates to a connection system (100) for a cryogenic tank (102), the tank wall (104) of which is formed with a first material (106), wherein the connection system (100) has a connector (110) for a component (116) to be connected to the tank (102), and wherein the connector (110) is formed with a second material (120), and the connector (110) is positioned on an exterior side of the tank (124) and essentially congruently with a passage opening (126) of the tank wall (104), and wherein at least one sealing element (130) is provided, and the first and the second material (106, 120) have different thermal expansion coefficients ($\alpha 1$, 2).

The invention provides that a counterpart (140) formed with the second material (120) be positioned on an interior side of the tank (136), and can be connected with the connector (110) with the help of at least two fastening elements (146, 148), such that the tank wall (104) is clamped between the counterpart (140), the connector (110) and the at least one sealing element (130), and a slight displaceability of the connector (110) and the counterpart (140) parallel to the tank wall (104) remains in order to compensate for thermally induced mechanical stresses.

The connector (110) and counterpart (140) are materially uniform, which results in identical thermal shrinkage and expansion rates in the case of high temperature fluctuations within a range of 200° C., both of which prevent transverse forces acting on the fastening elements (146, 148) from arising.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

10 Connection system (SdT)
12 Connection spigot
14 Tank wall
16 Tank
18 Flange
20 Connector
22 Exterior side (tank wall)
24 Sealing surface
26 Sealing element
30 Through hole
32 Through hole
34 Threaded bolt
36 Threaded bolt
38 Threaded insert
40 Threaded insert
46 Longitudinal center line
50 White arrow
52 Longitudinal center line (threaded bolt)
54 Outer contour (threaded bolt)
100 Connection system
102 Tank
104 Tank wall
106 First material (fiber composite plastic)
110 Connector
116 Component
120 Second material (metal)
124 Exterior side of tank
126 Passage opening (tank wall)
130 Sealing element
134 Longitudinal center line
136 Interior side of tank
140 Counterpart
146 Fastening element
148 Fastening element
150 Threaded bolt
152 Threaded bolt
154 Groove
156 Passage opening (sealing element)
158 Passage opening (sealing element)
160 First end (connector)
164 Fastening flange (connector)
168 Second end (connector)
172 Connecting flange (connector)
174 Contact surface (fastening flange)
178 Threaded hole (connector)
180 Threaded hole (connector)
182 Through hole (counterpart)
184 Through hole (counterpart)
186 Through hole (tank wall)
188 Through hole (tank wall)
200 Flat seal
210 Arrow
212 Arrow
214 Longitudinal center line
216 Through hole (tank wall)
218 Through hole (tank wall)
224 Through hole (connector)
226 Through hole (counterpart)
$\alpha_1$ Thermal expansion coefficient
$\alpha_2$ Thermal expansion coefficient
H Height (sealing elements)
$T_{1,2}$ Temperature
I First half of drawing
II Second half of drawing
III Third half of drawing
IV Fourth half of drawing

The invention claimed is:

1. A connection system for a cryogenic tank, the connection system comprising:
a tank wall formed with a first material,
and a connector for a component to be connected to the tank,
wherein the connector is formed with a second material, and the connector is positioned on an exterior side of the tank and at a passage opening of the tank wall,
wherein at least one sealing element is provided, and the first and the second materials have different thermal expansion coefficients,
wherein a counterpart formed with the second material is positioned on an interior side of the tank, and can be connected with the connector with at least two fastening elements, such that the tank wall is clamped between the counterpart, the connector and the at least one sealing element, wherein the connector and the counterpart are displaceable parallel to the tank wall in order to compensate for thermally induced mechanical stresses.

2. The connection system according to claim 1, wherein the connector is shaped as a sleeve, and has a continuous fastening flange on a first end that faces the exterior side of the tank, and a connecting flange for the component on a second end that points away from the component.

3. The connection system according to claim 2, wherein the at least two fastening elements are configured as threaded bolts.

4. The connection system according to claim 1, wherein the counterpart has a circular design.

5. The connection system according to claim 1, wherein the connector, the counterpart and the at least one sealing element are configured rotationally symmetrical to a longitudinal center line.

6. The connection system according to claim 3, wherein the continuous fastening flange has a number of non-continuous threaded holes corresponding to the number of threaded bolts, and the counterpart has a corresponding number of threadless through holes for the threaded bolts or vice versa.

7. The connection system according to claim 6, wherein, depending on whether the fastening flange of the connector or the counterpart is provided with the non-continuous threaded holes, the at least one sealing element is positioned at least one of between the exterior side of the tank and the fastening flange or between the counterpart and the interior side of the tank.

8. The connection system according to claim 1, wherein the first material is a fiber composite plastic.

9. The connection system according to claim 8, wherein the fiber composite plastic is a glass fiber reinforced or a carbon fiber reinforced plastic.

10. The connection system according to claim 8, wherein the second material is formed with a metal.

11. The connection system according to claim 10, wherein the metal comprises at least one of aluminum, titanium, stainless steel or a metal alloy.

12. The connection system according to claim 8, wherein the at least one sealing element is formed with a plastic.

13. The connection system according to claim 12, wherein the plastic is polytetrafluoroethylene.

14. The connection system according to claim 13, wherein the at least one sealing element is configured as a circular flat seal.

15. The connection system according to claim 13, wherein the at least one sealing element is configured as a spring-loaded seal.

* * * * *